March 12, 1940.   H. M. MILLER   2,193,409
RAIL JOINT FOR MONORAIL SYSTEMS
Filed Sept. 1, 1938
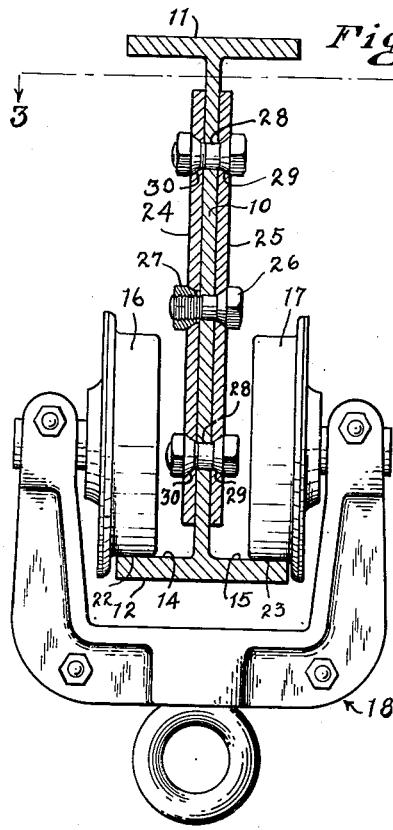
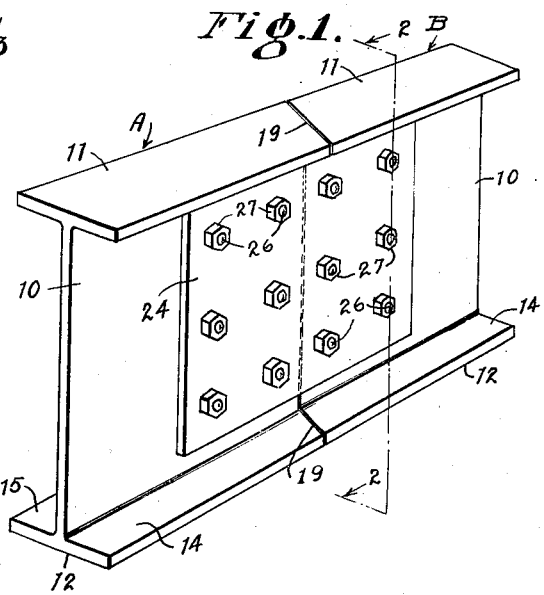
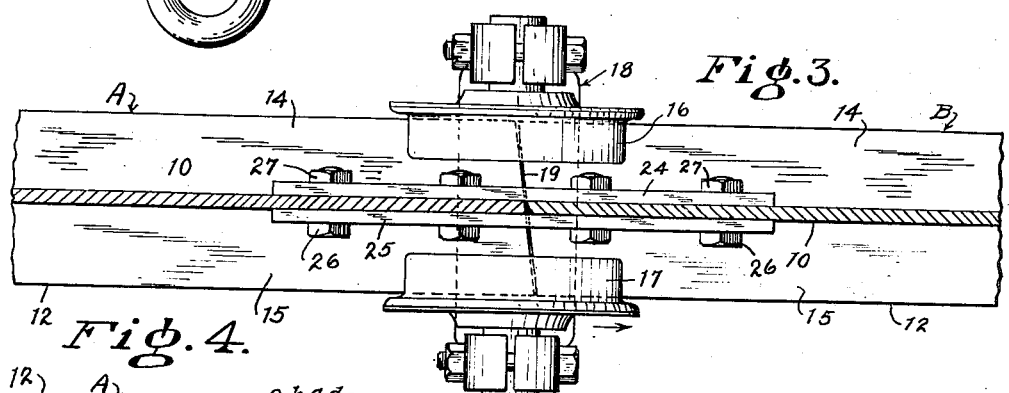
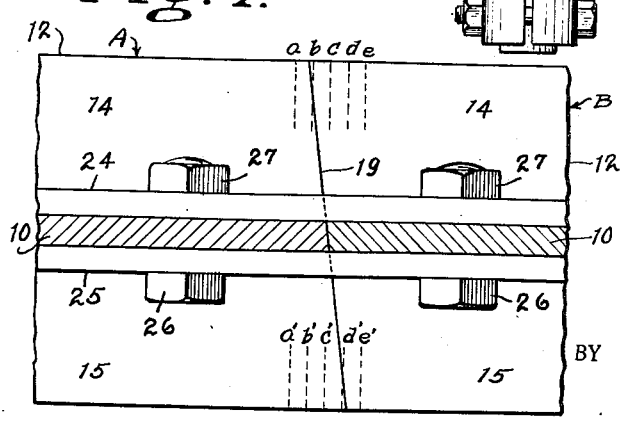
INVENTOR.
HENRY M. MILLER.
BY
ATTORNEYS.

Patented Mar. 12, 1940

2,193,409

UNITED STATES PATENT OFFICE 2,193,409

RAIL JOINT FOR MONORAIL SYSTEMS

Henry M. Miller, Lakewood, Ohio, assignor to The American Monorail Company, Lakewood, Ohio, a corporation of Ohio Application September 1, 1938, Serial No. 227,917

3 Claims. (Cl. 238—237)

This invention relates to overhead conveyors and more particularly to a rail joint for overhead rail runways for carrier and crane systems. In such systems the load carrying trolleys or carriers are supported by oppositely disposed wheels engaging the upper surfaces of the lower flanges of the rail. The loads are ordinarily suspended from the carriers by chains or other flexible members and therefore if the carriers are subjected to jars or vibrations passing over a rail joint, the load may be set to swinging which may result in injury to workmen, or in the load being damaged or dislodged. The danger is especially great where hot metal is being conveyed, as in foundries. Also, the carrier wheels are ordinarily of small diameter and may be subjected to heavy loads so that even a very small irregularity may subject a carrier to a severe jolt and will materially increase the force required to move the carrier along the track. Furthermore, in prior constructions, the joints are the weakest points in the rail systems and are subjected to the greatest loads and to severe shocks because of the sudden transfer of the load from one rail section to the next.

Accordingly, a general object of my invention is to provide an overhead rail runway or monorail system in which the trolleys or carriers can travel smoothly from one section of rail to a succeeding section without any jarring or jolting. A further object is the provision of such a system in which the rail joints and carrier wheels are so designed that the load of the carrier on the rail is transferred gradually from one rail section to the next as the carrier passes over the joint so that the load on the joints will be greatly reduced because of the elimination of shocks and jolts. A further object is to provide a rigid and strong rail joint for overhead rail runway or monorail systems which will not materially deflect under load. Another object is to provide a rail joint for such systems which can be economically produced and which can be readily assembled in the field.

Further objects and advantages of my invention will become apparent from the following description of a preferred form thereof. The essential characteristics are summarized in the claims.

Referring to the drawing, Figure 1 is a perspective view of a rail joint made according to a preferred form of my invention; Figure 2 is a vertical section through the rail shown in Figure 1 as indicated by the line 2—2 of Figure 1 and showing a carrier in position on the rail; Figure 3 is a sectional view of the rail joint shown in Figures 1 and 2 as indicated by line 3—3 on Figure 2; and Figure 4 diagrammatically illustrates the manner in which the load is gradually transferred from one rail section to the next section as the carrier progresses across the joint.

As shown in Figure 1 of the drawing a preferred form of rail joint made according to my invention may include two rail sections, A and B, each preferably comprising a web portion 10, an upper flange 11, and a lower flange 12 having flat horizontal upper surfaces 14 and 15 on opposite sides of the web 10 which support the wheels 16 and 17 of the carrier 18 which, for convenience of illustration, is shown as having only one pair of wheels. Obviously, trolleys or carriers with more than one pair of wheels may be employed. In order to effect a gradual transfer of the load and to eliminate jars and shocks, as the wheels pass from one rail section to the next, the abutting ends of the rail sections are preferably cut in a straight line at a slight angle to the perpendicular as indicated at 19.

To securely hold the adjacent rail ends together and to prevent any slippage of the diagonal joint the connection is preferably made by means of plates 24 and 25 bolted to opposite sides of the web 10 by a plurality of bolts 26 and associated nuts 27. The bolts pass through openings 28 in the webs 10 of both rails and the adjacent openings in the plates 24 and 25, these openings being counterbored as indicated at 29 and 30, the heads of the bolts 26 and the inner surface of the nuts 27 being made in conical form to engage the conical counterbores 29 and 30, respectively. By this construction there is no possibility of slippage taking place between the plates and the web 10 and thus the diagonal abutting ends of the rail sections are permanently and securely held in rigid and accurate alignment. Further the counterbore construction makes the entire assembly compact and prevents any possibility of interference between the wheels 16 and 17 and the bolts and nuts 26 and 27.

Because of the rigid diagonal joint, there is no substantial deflection at the joint and the load on the oppositely disposed wheels will be transferred successively from one rail section to the next. In order further to improve the joint, the wheels 16 and 17 are preferably formed so that they contact the upper horizontal surfaces of the flanges 14 and 15 in lines extending from substantially the entire width of the treads of the wheels as indicated at 22 and 23, respectively, in Figure 2, i. e., in the embodiment shown, the wheel treads are cylindrical to conform to the flat horizontal flanges.

By reason of this combination of wheels which make a line contact with the flanges of the rails and the diagonal splice 19, the load is transferred gradually from rail A to rail B as the carrier moves in the direction of the arrow in Figure 3. This will be evident from a consideration of Figure 4 which diagrammatically illustrates the action of the carrier wheels as they pass over the joint, the dash lines in Figure 4 showing successive lines of contact between the carrier wheels and the flanges of the rails as the carrier moves from rail A to rail B, the lines a, b, c, d, and e indicating the positions of wheel 16 while the lines a', b', c', d' and e' indicate the position of wheel 17.

The lines a and a' indicate the position of the carrier as it approaches the rail joint. At the position indicated by lines b and b' wheel 16 is passing over the diagonal joint 19 as shown by the line b, but wheel 17 has not yet reached the joint. In this position all of the load of wheel 17 is supported by rail A while part of the load of wheel 16 has been transferred to rail B, and as the carrier moves along more of the load will be gradually transferred to rail B until the condition indicated by the lines c and c' is reached where all of the load of wheel 16 has been transferred to rail B, but as wheel 17 has not yet reached the diagonal splice 19, it is supported entirely by rail A. Then, as the carrier travels farther in the direction of the arrow, wheel 17 gradually passes over the joint and a condition is reached as indicated by line d' where wheel 17 is supported by both rails, the load of wheel 16 of course being taken entirely by rail B. Continued movement of the carrier results in all of the load on wheel 17 being gradually transferred to rail B as the line of contact between the wheel and the rail passes over the diagonal joint until the position illustrated by the lines e and e' is reached where the load on both the wheels has been transferred to rail B. Thus it will be seen that the load is not only divided between the two flanges of the rail and transferred successively on the opposite flanges, but also the load on each flange is transferred gradually from rail A to rail B, both of these features resulting in the substantial elimination of deflection of the rails at the joints and a great reduction in the shocks and strains imposed upon the rails, and insuring the smooth travel of the carrier from one rail section to the next and preventing dangerous jolts or jars from taking place.

It will be noted that in the splice illustrated in the drawing the rail ends are shown as being cut at only a slight angle to the perpendicular, preferably considerably less than 45°. It is preferable to make the diagonal at only a sufficiently great angle to insure the load of one wheel being completely transferred from one rail to the next before the other wheel reaches the joint. With this construction, embodying only a slight angle, and line contact between the wheels and the rail flanges, a sufficiently gradual transfer of the loads is obtained to eliminate shocks while the rail is not weakened by long projecting ends on the flanges. Further such rail joints can be made with a minimum waste of material.

From the foregoing description of a preferred form of my invention it can be seen that I have provided an overhead rail runway conveyor or monorail system in which the carriers can pass from one rail section to another without shocks or jars. By my rail joint the load of each pair of carrier wheels is gradually transferred from one rail to a succeeding rail so that excessive deflection of the rails in the region of the joints is avoided and the rail is not subjected to the shock of the entire load passing immediately over the joint. In addition, the rail sections are securely bolted together in a manner to prevent relative movement between the rail ends, and the bolting arrangement is compact so that bolts of ample size and strength may be employed without interference between the trolley wheels and the nuts or bolts. By my construction weakness of the rails at the joints is eliminated, and my rail joint can be made with a minimum waste of material and may be readily and easily assembled in the field.

Various modifications and changes in my invention will be apparent to those skilled in the art. It is therefore to be understood that my patent is not limited to the preferred form of my invention described herein or in any manner other than by the scope of the appended claims.

I claim:

1. In combination, in an overhead rail runway system, two adjacent rail sections each having a vertical web and wheel supporting flanges on either side of said web adjacent the bottom thereof, a carrier adapted to carry a load disposed beneath the rail, said carrier having at least a pair of oppositely disposed wheels engaging the upper surfaces of said flanges, said wheels having tread portions making line contact with the upper surfaces of said flanges in zones spaced from said web throughout substantially the entire width of said tread portions, the adjacent ends of said rail sections being shaped to form a rail joint extending obliquely across said rail, whereby the oppositely disposed wheels pass successively across the joint, and the load of each wheel is transferred gradually from one rail section to the next as the carrier passes the joint, and means for holding the ends of the rail sections in alignment.

2. In combination, in an overhead rail runway system, two adjacent rail sections each having a vertical web and flanges extending on either side of said web adjacent the bottom thereof, said flanges having flat horizontal upper surfaces, a carrier adapted to carry a load disposed beneath the rail, said carrier having at least a pair of oppositely disposed wheels engaging the upper surfaces of said flanges, said wheels having cylindrical tread portions making line contact with said flanges, throughout substantially the entire width of said tread portions, the adjacent ends of said rail sections being shaped to form a joint extending obliquely across said rail at an angle of more than 45° to the plane of the web whereby the oppositely disposed wheels pass successively across the joint, and the load of each wheel is transferred gradually from one rail section to the next as the carrier passes the joint, and means for holding the ends of the rail sections in alignment.

3. A rail joint for overhead rail runway systems comprising two rail sections, each section comprising a central vertical web portion and wheel supporting flanges extending outwardly from the lower portion of said web on either side thereof, said rail sections having their abutting ends shaped to provide a joint extending obliquely across the rail through said flanges and said webs in a substantially straight line whereby the joints in the wheel supporting flanges are offset with respect to each other, whereby oppositely disposed wheels engaging said wheel supporting flanges pass successively across the joint and the load of each wheel will be transferred gradually from one rail section to the next, and means for rigidly holding the ends of said rails in alignment comprising a pair of plates engaging opposite sides of said webs and spanning said joint, said plates and said webs being provided with a plurality of registering openings, the openings in said plates being provided with conical counterbored portions, bolts passing through said apertures, and nuts in engagement with said bolts for clamping said plates against said webs, said bolts and nuts having conical inner faces engaging the counterbored portions of the apertures in said plates.

HENRY M. MILLER.